(12) United States Patent
Hwang et al.

(10) Patent No.: US 7,543,219 B2
(45) Date of Patent: Jun. 2, 2009

(54) RECORDING AND/OR REPRODUCING METHOD, RECORDING AND/OR REPRODUCING APPARATUS, AND COMPUTER READABLE RECORDING MEDIUM STORING PROGRAM FOR PERFORMING THE METHOD

(75) Inventors: Sung-hee Hwang, Gangnam-gu (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 11/594,119

(22) Filed: Nov. 8, 2006

(65) Prior Publication Data

US 2007/0070842 A1  Mar. 29, 2007

Related U.S. Application Data

(63) Continuation of application No. 11/047,710, filed on Feb. 2, 2005.

(30) Foreign Application Priority Data

Feb. 19, 2004  (KR)  ............................... 2004-11073

(51) Int. Cl.
  *G11C 29/00*  (2006.01)
(52) U.S. Cl. .................. 714/769; 369/47.27; 369/53.35
(58) Field of Classification Search ................ 714/769; 369/47.27
  See application file for complete search history.

(56) References Cited

U.S. PATENT DOCUMENTS 5,642,338 A  6/1997  Fukushima et al.
5,798,995 A *  8/1998  Fukushima et al. ........... 386/98
6,108,158 A *  8/2000  Katayama et al. ......... 360/77.04
6,367,049 B1  4/2002  Van Dijk et al.
2003/0161239 A1  8/2003  Yamawaki

FOREIGN PATENT DOCUMENTS

JP  61-63968  4/1986

OTHER PUBLICATIONS

Search Report issued in Singapore Patent Application No. 200500626-7 on Aug. 25, 2006.
Search Report dated Oct. 4, 2005 issued in European Patent Application No. PCT/05250794.4-2223.
Coene, Wim et al. "Channel Coding and Signal Processing for Optical Recording Systems beyond DVD," 2001, IEEE, pp. 682-688.
Narahara, Tatsuya et al. "Optical Disc System for Digital Video Recording," Japanese Journal of Applied Physics, vol. 39. Part 1, No. 2B, Feb. 2000, pp. 912-919.

* cited by examiner

*Primary Examiner*—Guy J Lamarre
(74) *Attorney, Agent, or Firm*—Stein McEwen, LLP

(57) ABSTRACT

A recording and/or reproducing method, a recording and/or reproducing apparatus, and a computer readable recording medium storing a program for performing the method. A recording unit block in which invalid data is partially padded is written on an information storage medium along with padding information indicating that the invalid data is included in the recording unit block. The padding information is useful in determining whether the recording unit block includes the padding data. Accordingly, unnecessary retrial processes of a drive system are reduced such that the performance of the drive system is improved and error correction capability is enhanced.

10 Claims, 11 Drawing Sheets

RECORDING AND/OR REPRODUCING METHOD, RECORDING AND/OR REPRODUCING APPARATUS, AND COMPUTER READABLE RECORDING MEDIUM STORING PROGRAM FOR PERFORMING THE METHOD

CROSS-REFERENCE TO RELATED APPLICATIONS

This application is a continuation application of Ser. No. 11/047,710, filed Feb. 2, 2005, currently pending, which claims all benefits accruing under 35 U.S.C. §119 from Korean Patent Application No. 2004-11073, filed on Feb. 19, 2004 in the Korean Intellectual Property Office, the disclosure of which is incorporated herein by reference.

BACKGROUND OF THE INVENTION

1. Field of the Invention

The present invention relates to a disc, and more particularly, to a recording and/or reproducing method, a recording and/or reproducing apparatus, and a computer readable recording medium storing a program for performing the method.

2. Description of the Related Art

Recording data on or reproducing data from an information storage medium, such as a hard disc (HD), a compact disc (CD), and a digital versatile disc (DVD), is performed in predetermined units. The unit is referred to as a recording unit block or a reproducing unit block. An error correction block for correcting an error occurring when data is recorded or reproduced is an example of a recording unit block or a reproducing unit block.

When the size of an error correction block is 64 Kbytes and 4 Kbytes long data that corresponds to part of the error correction block is desired to be recorded, meaningless values, such as 00h, are added to the remaining part of the error correction block, that is, 60 Kbytes, and then recorded.

In order to reproduce the error correction block in which only part of the block has meaningful data, a disc drive reads the error correction block and performs error correction. However, even though error correction of the meaningful 4 Kbytes long data is possible, error correction of codewords including the remaining 60 Kbytes long data padded with meaningless values, is impossible and therefore error correction of the entire error correction block is impossible as well. Since the disc drive cannot identify which part in an error correction block is meaningful data and which part is padded with meaningless data, there is a problem in that the disc drive tries to perform error correction or data reproduction again, or despite the presence of meaningful data in part of the error correction block, finally regards the error correction block as an error. This situation takes place not only in a data reproduction operation, but also in a data update operation and a data addition operation in the same manner.

Meanwhile, U.S. Pat. No. 6,367,049 (hereinafter referred to as 'interleaving encoding') discloses a technology for encoding data. In interleaving encoding, a plurality of LDC blocks, each block including user data, and a plurality of burst indicator subcode (BIS) blocks, each block including address data, are arranged in one physical cluster in an interleaving manner and recorded. When data is reproduced, error correction of a block including address data is performed, and then error correction of a block including user data is performed. Referring to FIG. 1, interleaving encoding will now be briefly explained.

FIG. 1 is a reference diagram explaining encoding data by an interleaving method according to an example of a conventional technology.

Referring to FIG. 1, user data 11 received from a source, such as a host and an application, is divided into data frames, each frame formed with (2048+4) bytes. The divided user data forms a data block 12 arranged in 304 columns and 216 rows. Next, by adding a 32-row parity data to the data block 12, an LDC block 13 is formed. These LDC blocks 13 are arranged in 152 columns and 496 rows to form an error correction code (ECC) cluster 14. This ECC cluster 14 is distributed to fill ECC parts of a physical cluster block 20.

A logical address and control data 15 combined by a recording system are arranged in 32*18 bytes. A physical address related to a physical location on a medium is arranged in 16*9 bytes. The logical address+control data 15 and the physical address 16 are combined to form an access block 17 of 24 columns*30 rows. Then, the 32-row parity data is added to the access block 17, and a BIS block 18 is formed. These BIS blocks 18 are arranged as a BIS cluster 19 of 3 columns and 496 rows. The BIS cluster 19 is distributed to fill BIS columns of the physical cluster block 20. Then, by adding one column of a synchronization bit group to the physical cluster block 20, a physical cluster of 155 columns*496 rows is formed. Thus, by arranging data in a manner of interleaving as presented above, the error correction capability is enhanced.

Meanwhile, when data is desired to be recorded on a recordable information storage medium, a drive system records the data in units of clusters that are recording units. When it is assumed that a cluster is formed with, for example, 32 sectors, if the size of sectors that should be recorded is not a multiple of 32, the drive system pads some meaningless sectors to make a multiple unit of the cluster in order to fit the cluster unit, and then records the data.

Also, when data is desired to be added to or updated in a cluster already recorded on a recordable information storage, if some sectors that are not a unit of cluster (that is, not among the 32 sectors), for example, 16 sectors, are recorded, the drive system reads a cluster formed with 32 sectors including the 16 sectors to be added or updated, from a disc and stores them in an internal memory. Then, in this cluster, the 16 sectors desired to be added or updated after error correction are modified in the corresponding location of the internal memory, and then, together with the remaining 16 sectors, are encoded as one ECC cluster and recorded. This process is referred to as read-modify-write. Of course, in the reproduction process of the cluster in the recordable information storage medium, if the cluster is not defective, the cluster is recorded to an identical physical address. If the cluster is defective, the cluster is recorded in a replacement cluster by a defect management method. In a write once recording information storage medium, since writing is permitted only once, the cluster in which data is added or updated is recorded in a replacement cluster by defect processing.

An operation for adding data to or updating data in a cluster in which 16 sectors are already recorded in the data structure by interleaving encoding will now be explained in more detail. When a read operation is performed in a read-modify-write process in order to add or update the 16 sectors, data of a recording/reproducing unit cluster is read and stored in an internal memory. Then, error correction of the BIS cluster is first performed and then error correction of the ECC cluster for 32 sectors of data is performed. At this time, if error correction of the ECC cluster is not successful, the remaining 16 sectors, excluding the 16 sectors desired to be added or updated, cannot be reproduced and a problem in recording the data desired to be added or updated occurs. This is because valid data may be included in the 16 remaining sectors, and therefore error correction should be performed fully. Accordingly, in this case, if it is not known whether data in the 16 remaining sectors is valid, the drive system has to access the cluster on the disc and try to reproduce data again. If the cluster cannot be reproduced despite this retrial, the drive has to report an error message to a host. Accordingly, useless operations of the drive system inevitably occur in this situation.

Also, in this case, if the drive system is informed whether the data in the 16 sectors is valid, and that the data in the 16 remaining sectors is invalid, the drive system can add data to or update the new data in the 16 sectors without unnecessarily trying to reproduce data again or reporting an error message to the host. However, since it is not known whether the data in the remaining 16 sectors is valid, the probability that the drive system regards this as an error increases and as a result, the error correction capability decreases.

SUMMARY OF THE INVENTION

The present invention provides a recording and/or reproducing method, a recording and/or reproducing apparatus, and a computer readable recording medium storing a program for performing the method in which by confirming whether data in a recording unit block of a disc is valid, when data is added to the disc or data recorded on the disc is updated, operations of a drive system are prevented and the error correction capability is improved.

According to an aspect of the present invention, a data recording and/or reproducing method comprises: writing on an information recording medium a recording unit block in which invalid data is partially padded, or reading the recording unit block from the information recording medium; and updating valid data included in the recording unit block based on padding information indicating that the invalid data is included in the recording unit block.

In updating the valid data, valid data included in the recording unit block may be updated regardless of error correction of data of the recording unit block if from the padding information it is confirmed that data excluding data desired to be updated in the recording unit block is invalid data.

The updating of the valid data may include: performing error correction of the recording unit block including the padding information; confirming that data excluding the data desired to be updated in the recording unit block has invalid data from the error corrected padding information; generating a replacement recording unit block by padding the invalid data with the updated data even when error correction of the recording unit block fails; and recording the generated replacement recording unit block in a replacement position of the medium.

In updating the valid data, data desired to be updated included in the recording unit block may be updated regardless of error correction of the invalid data if from the padding information it is confirmed that among data excluding data desired to be updated in the recording unit block, valid data and invalid data are included.

The updating of the valid data may include: performing error correction of the recording unit block including the padding information; confirming that valid data and invalid data are included in data excluding the data desired to be updated in the recording unit block from the error corrected padding information; generating a replacement recording unit block by updating data desired to be updated in the recording unit block even when error correction of the invalid data has failed; and recording the generated replacement recording unit block in a replacement position of the medium.

According to another aspect of the present invention, there is provided a data recording and/or reproducing method including: writing on an information recording medium a recording unit block in which invalid data is partially padded, or reading the recording unit block from the information recording medium; and adding new data in the recording unit block based on padding information indicating that the invalid data is included in the recording unit block.

In adding new data, the new data may be added to the recording unit block regardless of error correction of data of the recording unit block if from the padding information it is confirmed that data excluding data desired to be added in the recording unit block is invalid data.

Adding new data may include: performing error correction of the recording unit block including the padding information; confirming that invalid data is recorded in a position excluding the position in which data is desired to be added in the recording unit block from the error corrected padding information; generating a replacement recording unit block by padding the invalid data with the new data even when error correction of the recording unit block has failed; and recording the generated replacement recording unit block in a replacement position of the medium.

In adding new data, new data may be added to the recording unit block regardless of error correction of the invalid data if from the padding information it is confirmed that valid data and invalid data are recorded in a position excluding the position in which data is desired to be added in the recording unit block.

Adding new data may include: performing error correction of the recording unit block including the padding information; confirming that valid data and invalid data are recorded in a position excluding the position in which data is desired to be added in the recording unit block from the error corrected padding information; generating a replacement recording unit block by adding the new data to the recording unit block even when error correction of the invalid data has failed; and recording the generated replacement recording unit block in a replacement position of the medium.

According to still another aspect of the present invention, there is provided a data recording and/or reproducing apparatus including: a writing/reading unit writing a recording unit block in which invalid data is partially padded, on an information recording medium, or reading the recording unit block from the information recording medium; and a control unit controlling the writing/reading unit to update valid data in the recording unit block based on padding information indicating that the invalid data is included in the recording unit block.

According to yet still another aspect of the present invention, there is provided a data recording and/or reproducing apparatus including: a writing/reading unit writing on an information recording medium a recording unit block in which invalid data is partially padded, or reading the recording unit block from the information recording medium; and a control unit controlling the writing/reading unit to add new data in the recording unit block based on padding information indicating that the invalid data is included in the recording unit block.

According to a further aspect of the present invention, there is provided a computer readable medium having embodied thereon a computer program for executing, a data recording and/or reproducing method, wherein the data recording and/or reproducing method includes: writing on an information recording medium a recording unit block in which invalid data is partially padded, or reading the recording unit block from the information recording medium; and updating valid data included in the recording unit block based on padding information indicating that the invalid data is included in the recording unit block.

According to an additional aspect of the present invention, there is provided a computer readable medium having embodied thereon a computer program for executing a data recording/or reproducing method, wherein the data recording and/or reproducing method includes: writing on an information recording medium a recording unit block in which invalid data is partially padded, or reading the recording unit block from the information recording medium; and adding new data in the recording unit block based on padding information indicating that the invalid data is included in the recording unit block.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF THE PREFERRED EMBODIMENTS

Figure 1:
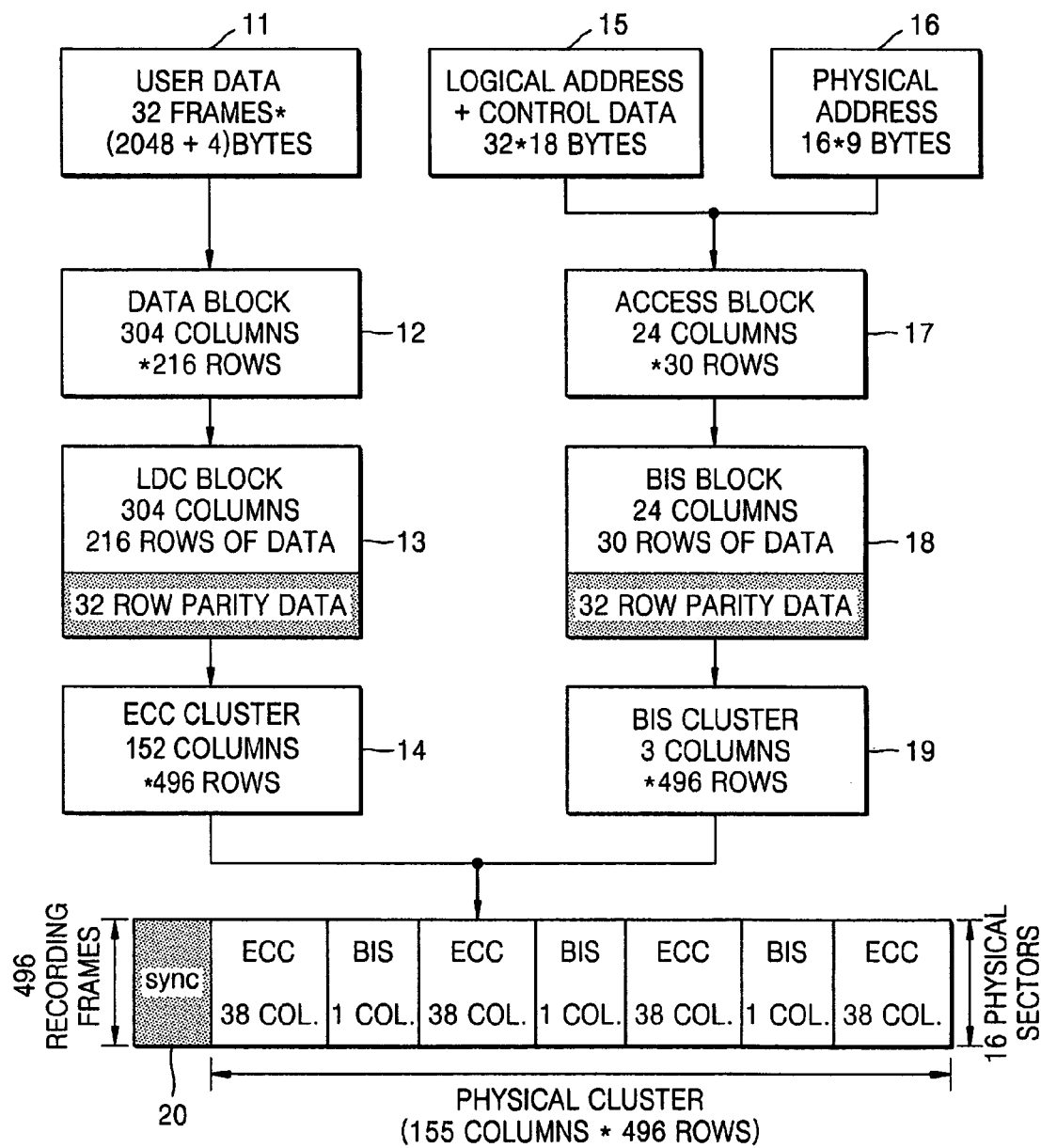
FIG. 1 is a diagram for explaining encoding of data by an interleaving method according to an example of a conventional technology.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
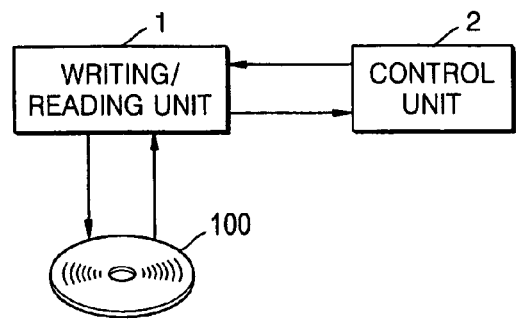
FIG. 2 is a block diagram of a recording and/or reproducing apparatus according to an embodiment of the present invention.

Referring to FIG. 2, a recording and/or reproducing apparatus according to an embodiment of the present invention includes a writing/reading unit 1 and a control unit 2.

According to a control of the control unit 2, the writing/reading unit 1 writes data on a disc 100 that is an information storage medium according to the present embodiment, or reads the recorded data.

The control unit 2 controls the writing/reading unit 1 so that data is recorded in units of predetermined recording unit blocks, or obtains valid data by processing data read by the writing/reading unit 1.

Reproduction is defined as obtaining valid data by performing error correction of read data, and is performed in a predetermined unit. A unit by which reproduction is performed is referred to as a reproducing unit block corresponding to a recording unit block. A reproducing unit block corresponds to at least one recording unit block.

When data is recorded, if the control unit 2 records on the disc 100 data of an amount that cannot fill up a recording unit block, the control unit 2 makes a recording unit block of a predetermined size in which valid data is contained in part of the block and invalid data is padded in the remaining part of the block, and then records the recording unit block. In particular, according to the present invention, the control unit 2 records padding information indicating that invalid data is contained, on the disc 100. This padding information according to the present invention may be recorded in a recording unit block or in an area other than a recording unit block, for example, in a linking area. Padding information is not limited to indication that invalid data is inserted, but includes indication that information which enables distinguishing valid information from invalid information is inserted, as explained in detail below.

When data is reproduced, the writing/reading unit 1 reads at least one recording unit block, in which valid data is contained in part of the block and invalid data is padded in a remaining part of the block, from the disc 100, and the control unit extracts only valid data based on the padding information contained in the recording unit block, and reproduces the data.

Figure 3:
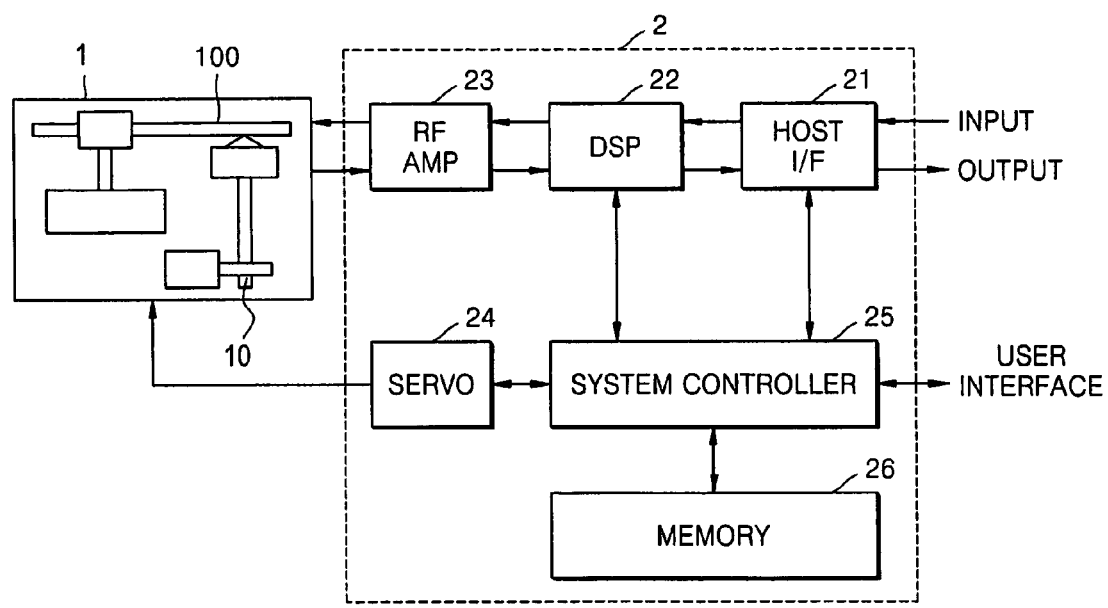
FIG. 3 is a detailed block diagram of the recording and/or reproducing apparatus shown in FIG. 2.

FIG. 3 is a diagram of the structure of the recording and/or reproducing apparatus shown in FIG. 2, which is implemented as a disc drive system.

Referring to FIG. 3, the writing/reading unit 1 of the disc drive comprises a pickup 10. The disc 100 is placed on the pickup 10. The control unit 2 comprises a host I/F 21, a digital signal processor (DSP) 22, an RF AMP 23, a servo 24, a system controller 25, and a memory 26.

When data is recorded, the host I/F 21 receives a record command together with data to be recorded from a host (not shown). The system controller 25 performs initialization required for recording. By adding additional data for error correction, such as parity data, to the data to be recorded, which is received from the host I/F 21, and by performing ECC encoding, the DSP 22 generates an ECC block that is an error correction block, and then modulates the block in a predetermined method. Here, when data of an amount that is less than the size of an ECC block is desired to be recorded, invalid data is padded to generate an ECC block. Padding information may be added first, and then ECC encoding may be performed, or ECC encoding may be performed first and then padding information may be added. The RF AMP 23 converts the data output from the DSP 22 into an RF signal. The pickup 10 records the RF signal output from the RF AMP 23 on the disc 100. The servo 24 receives a command input required for servo control, from the system controller 25 and performs servo control.

In particular, the operations for updating or adding data included in a recording unit block in which padding information is recorded according to the present invention will now be explained.

If an update or addition command of data included in a recording unit block is received from the host, the system controller 25 reads the recording unit block from the disc 100 and stores the read data in the memory 26. Then, the system controller 25 performs error correction of padding information on the recording unit block first, and confirms valid data and invalid data included in the recording unit block. When in the remaining position, except a position of the recording unit block in which data is desired to be added or updated, only padding data (i.e., invalid data) is recorded. Even when error correction of data included in the recording unit block has failed, data addition or update may be performed. That is, when only padding data is recorded in the position except the position of data desired to be added or updated, the system controller 25 adds data to or updates data in the position desired to be added or update, in the recording unit block stored in the memory 26, and adds padding data in the remaining position to make one recording unit block, and records the recording unit block on the disc 100. This will be explained in more detail below.

When data is reproduced, the host I/F 21 receives a read command from the host (not shown). The system controller 25 performs initialization required for reproduction. The pickup 10 applies a laser beam on the disc 100 and outputs an optical signal obtained by receiving the laser beam reflected by the disc 100. The RF AMP 23 converts the optical signal output from the pickup 10 into an RF signal, provides modulated data obtained from the RF signal to the DSP 22, and at the same time provides a servo signal for control obtained from the RF signal to the servo 24. The DSP 22 demodulates the modulated data, performs ECC error correction, and outputs the obtained data. In the case of an ECC block in which valid data is recorded only in part of the block, only valid data is reproduced by referring to padding information.

Meanwhile, the servo 24 receives the servo signal received from the RF AMP 23 and the command required for servo control received from the system controller 25, and servo controls the pickup 10. The host I/F 21 transfers data received from the DSP 22 to the host.

Figure 4A:
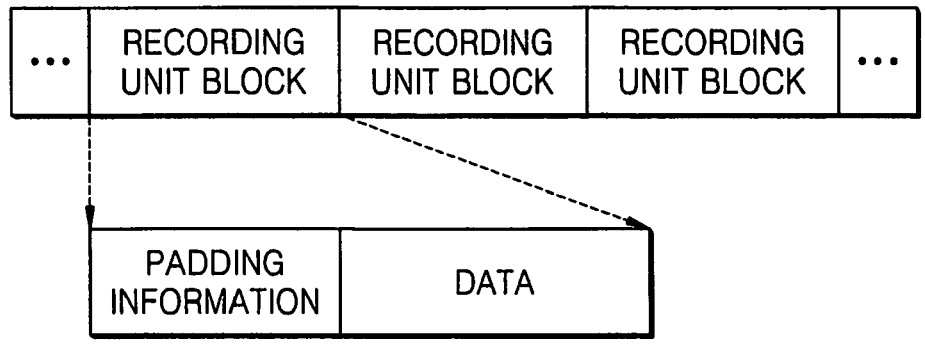
FIG. 4A is a diagram showing a recording unit block in which padding information is inserted.

FIG. 4A is a diagram showing a recording unit block in which padding information is inserted according to the present invention.

Referring to FIG. 4A, in the present embodiment, padding information is recorded in a recording unit block and corresponds to one recording unit block. That is, padding information is recorded in each recording unit block. A recording unit block is a unit for performing recording data, and usually has a predetermined size.

In another embodiment, the padding information is recorded in a recording unit block, but may be recorded once in a predetermined plurality of recording unit blocks such that padding information corresponds to the plurality of recording unit blocks.

Figure 4B:
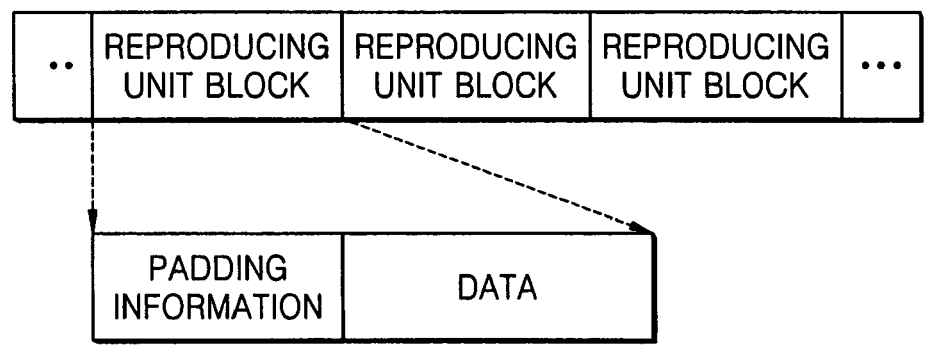
FIG. 4B is a diagram showing a reproducing unit block in which padding information is inserted.

FIG. 4B is a diagram showing a reproducing unit block in which padding information is inserted according to the present invention.

Referring to FIG. 4B, in the present embodiment, padding information corresponds to one reproducing unit block. That is, padding information is recorded in each reproducing unit block. A reproducing unit block corresponds to at least one recording unit block. Accordingly, padding information may be actually recorded in a recording unit block or outside a recording unit block.

In another embodiment, the padding information may be recorded once in a predetermined plurality of reproducing unit blocks such that padding information corresponds to the plurality of reproducing unit blocks.

Figure 5:
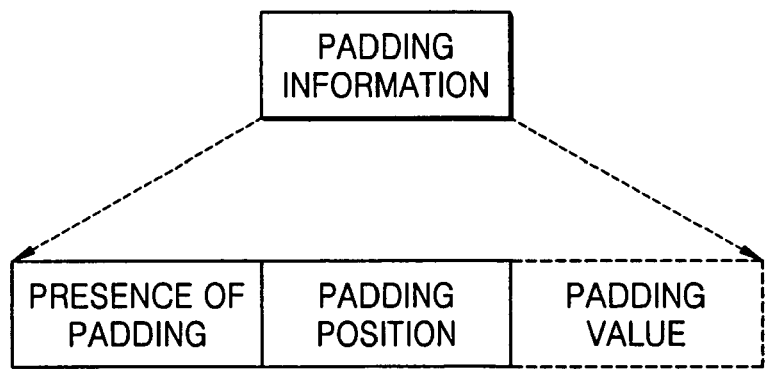
FIG. 5 is a diagram of a data structure of the padding information shown in FIGS. 4A and 4B.

FIG. 5 is a detailed diagram of the data structure of padding information according to the present invention.

Referring to FIG. 5, padding information is formed with padding presence information, padding position information, and a padding value. Padding presence information indicates whether there is padded data in a predetermined unit block, for example, in a recording unit block. Padding position information indicates positions of valid data and invalid data in a recording unit block. The padding value indicates the padded value. When a value to be padded is preset, the padding value may not be recorded.

With this padding information, even when error correction of data included in a recording unit block has failed, the disc drive shown in FIG. 3 can update or add valid data. Even when error correction of a recording unit block is impossible, if data, except data to be updated or added in a recording unit block, is a codeword including invalid data, by adding data to or updating data in the recording unit block, the data may be recorded on the disc. A part corresponding to the invalid information in the recording unit block contains the value padded when data is recorded without change, and is recorded on the disc.

Based on the padding information having the structure described above, referring again to FIG. 3, the operation of the disc drive will now be explained in more detail.

Generally, the amount of disc management information recorded in a lead-in area or a lead-out of the disc 100 is smaller than the size of a recording unit block (example: 64 Kbytes). For smooth use of the disc 100, the system controller 25 pads a predetermined value, such as 00h, to fill the lacking part of a recording unit block, generates a predetermined size of the recording unit block, and transfers the recording unit block to the pickup 10.

Alternatively, when data is recorded by a write command of the host, if the size of data desired to be recorded by the host is not a multiple of a recording unit block (example: 64Kbytes), the system controller 25 receives the data transmitted by the host, and divides and records the data to fit the size of the recording unit block. For the remaining part that cannot fill up a recording unit block, the system controller 25 pads a predetermined value, such as 00h, to make a predetermined size of a recording unit block and transfers the block to the pickup 10.

When part of a recording unit block is padded with a predetermined value, such as 00h, padding information is recorded together inside or outside the recording unit to indicate that there is invalid padded data, and positions of valid data and invalid data in the recording unit block, and records the value of invalid data (that is, the padded value, if 00h is padded, 00h, and if ffh is padded, ffh).

Figure 6:
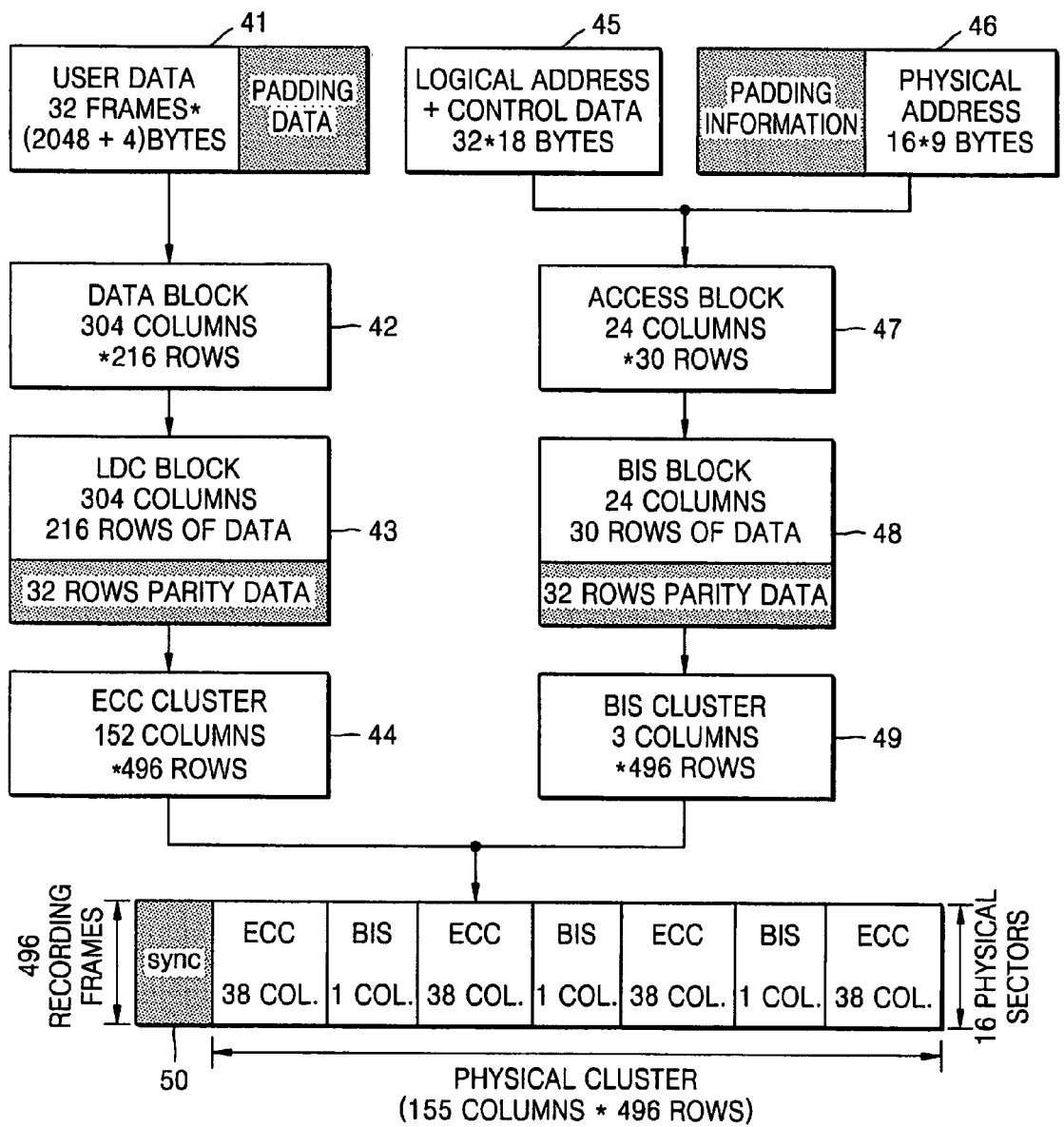
FIG. 6 is a diagram for explaining encoding of data by inserting padding data and padding information.

FIG. 6 shows an example of a data structure encoded by inserting padding information according to the present invention. The data structure shows an example in which padding information according to the present invention is applied to a data structure as disclosed with respect to the interleaving encoding technology.

However, it should be noted that a data structure and a system to which padding information according to the present invention may be applied needs only that user data and padding information are separately ECC encoded, and error correction of padding information is performed first before error correction of user data is performed. The system and structure according to the interleaving encoding technology as shown in FIG. 6 are shown for convenience of explanation, and are just an example in which the padding information may be applied.

Referring to FIG. 6, invalid data, that is, padding data, is padded in part of user data 41 forming an ECC cluster. Then, padding information that is information on this padding data is inserted into a part of physical address data 46 forming a BIS cluster 49. Padding information is information on valid sectors and invalid sectors included in an ECC cluster. By using padding information in units of sectors thus included in the BIS cluster, the drive system identifies the validity of sectors except sectors desired to be added or updated in a read process of a read-modify-write operation such that even though error correction of the ECC cluster cannot be performed, sectors desired to be added or updated may be recorded together with the remaining invalid padding sectors in a replacement cluster.

Although FIG. 6 shows that padding information according to the present invention is inserted into the physical address data 46, the present invention is not limited to insertion of padding information into the physical address 46 and padding information according to the present invention may be inserted into the logical address+control data 45.

FIGS. 7A through 7D are diagrams showing states of a recording unit block when data of the recording unit block is updated according to the present invention in the example of a data structure shown in FIG. 6.

Figure 7A:
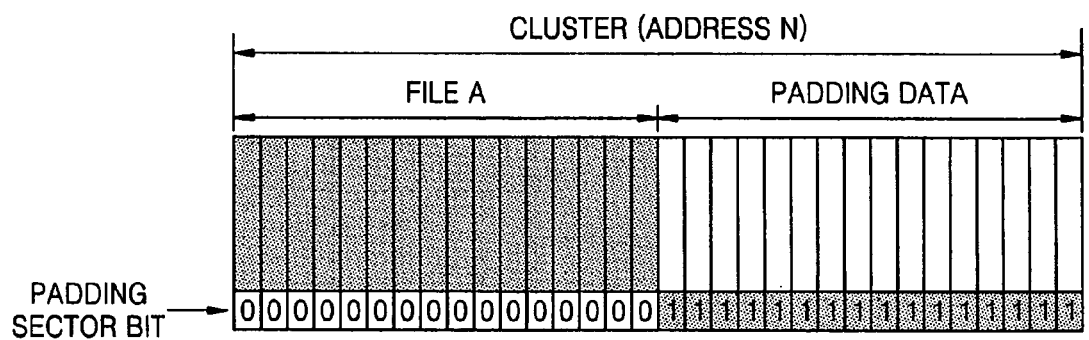
FIGS. 7A through 7D are diagrams showing states of a recording unit block when data of the recording unit block is updated.

Referring to FIG. 7A, the logical structure of data recorded in a cluster having physical address N in a user data area on a disc is shown. The 32-sector cluster is formed with a 16-sector file A and 16 sectors of padding data. In order to indicate that file A is valid data, padding sector bits for sectors of file A are expressed as 0's, and in order to indicate that padding data is invalid data, padding sector bits for sectors of padding data are expressed as 1's. Physically, these padding sector bits may be included in the padding information.

In the state shown in FIG. 7A, if a host sends a command to update an address corresponding to the logical address of file A with file A', the drive system finds a physical address corresponding to the logical address of the 16-sector file A, and reads a cluster including the physical address, that is, a cluster having physical address N, from the disc for a read-modify-write operation. At this time, the drive system stores the cluster N in an internal memory, performs error correction of the BIS cluster, first, and then error correction of the ECC cluster.

Figure 7B:
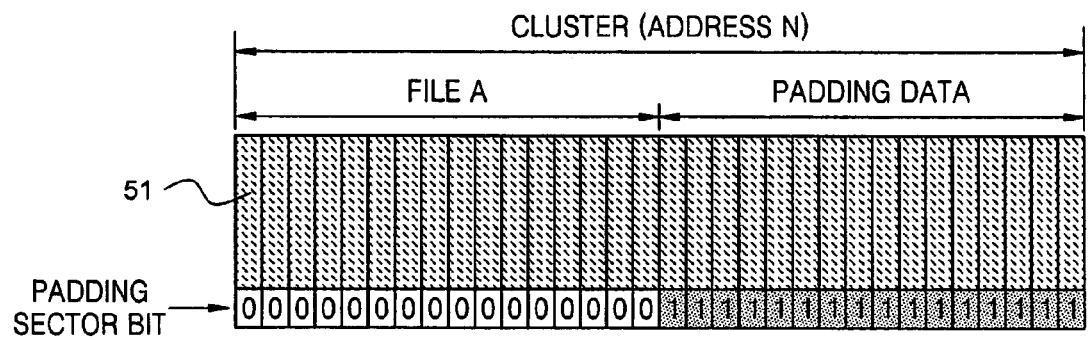

Referring to FIG. 7B, a case in which error correction of the BIS cluster is successful but error correction of the ECC cluster is not successful is explained. From the error correction of the BIS cluster, whether padding is performed in each sector in cluster N, that is, the validity of data sectors, is confirmed such that it is known that the low-order 16 sectors of cluster N are padding data. The thirty two shaded portions 51 in the sector part in FIG. 7B indicate that error correction of the ECC cluster has failed.

However, even though error correction of the ECC cluster is thus not successful, the update command may be performed by using padding information of the BIS cluster. That is, if it is known that the remaining part excluding a part desired to be updated by an update command is padding data, that is, invalid data, even though error correction of the ECC cluster is not performed, there is no problem in performing a data update operation. In other words, since data in the part to be updated will be updated anyhow, the part to be updated does not need error correction, and also, if data except the part to be updated is invalid data, this part does not need error correction either.

Figure 7C:
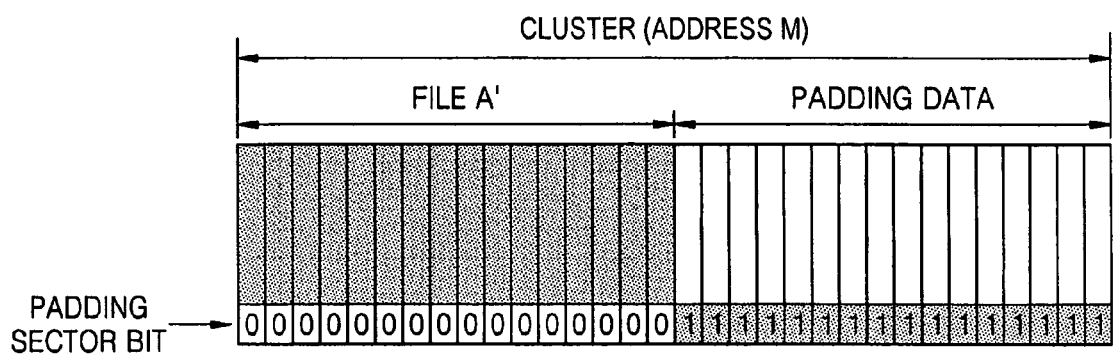

When there is a defect in the cluster in this situation, FIG. 7C shows a cluster in which data in part of the cluster is updated and the cluster is moved to address M replacing address N. The replacement cluster formed by recording file A' for update in an address desired to be updated in the cluster, that is, in the position of the high-order 16 sectors in which file A is recorded, and padding the padding data in the low-order 16 sectors, is recorded in address M. In order to indicate that file A' is valid data, padding sector bits for sectors of file A' are expressed as 0's and in order to indicate that padding data is invalid data, padding sector bits for sectors of padding data are expressed as 1's.

Figure 7D:
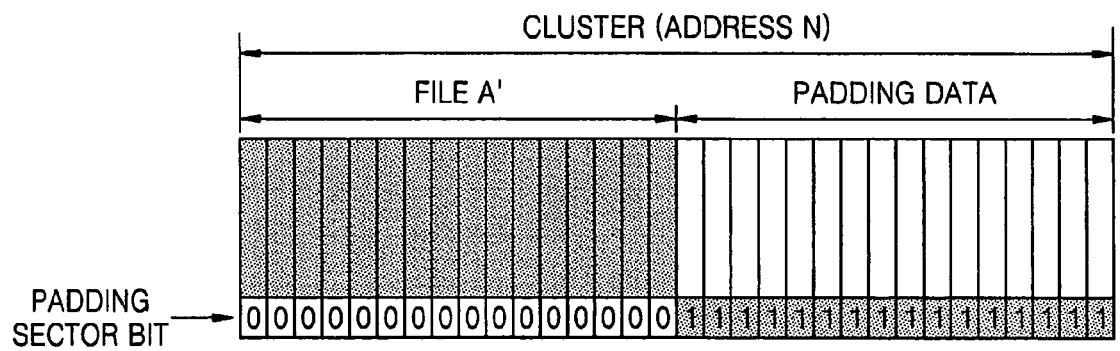

When there is no defect in the cluster shown in FIG. 7B, FIG. 7D shows the cluster in which data is updated. When there is no defect in the cluster, by a normal read-modify-write operation, file A' for update is recorded to an address desired to be updated in the cluster, that is, in the position of the high-order 16 sectors in which file A is recorded, and padding data is padded in the low-order 16 sectors, and then the cluster is recorded to address N. In order to indicate that file A' is valid data, padding sector bits for sectors of file A' are expressed as 0's, and in order to indicate that padding data is invalid data, padding sector bits for sectors of padding data are expressed as 1's.

FIGS. 8A through 8D are diagrams showing states of a recording unit block when data of the recording unit block is added according to the present invention in the example of a data structure as shown in FIG. 6.

Figure 8A:
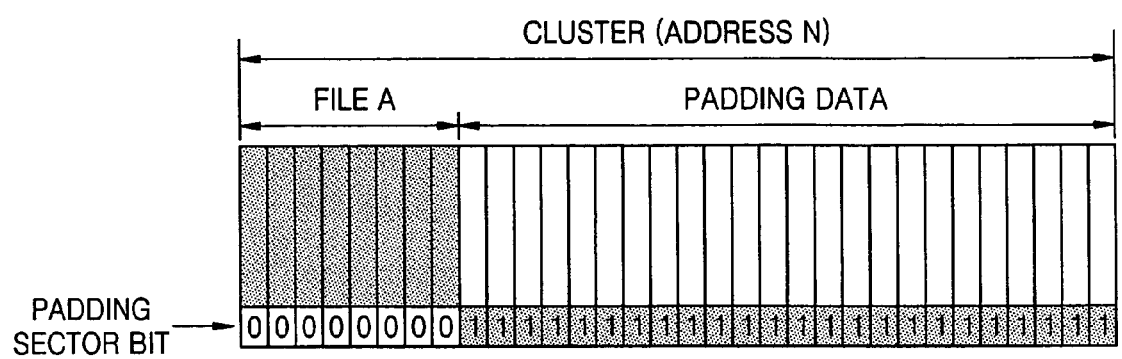
FIGS. 8A through 8D are diagrams showing states of a recording unit block when data of the recording unit block is added.

Referring to FIG. 8A, the logical structure of data recorded in a cluster having physical address N in a user data area on a disc is shown. The 32-sector cluster is formed with an 8-sector file A and 24-sectors of padding data. In order to indicate that file A is valid data, padding sector bits for sectors of file A are expressed as 0's, and in order to indicate that padding data is invalid data, padding sector bits for sectors of padding data are expressed as 1's. Physically, these padding sector bits may be included in the padding information.

In the state shown in FIG. 8A, if a host sends a command to add file B in low-order 8 sectors of the cluster at address N, the drive system finds a physical address corresponding to the logical address for 8-sector file B, and reads a cluster including the physical address, that is, a cluster having physical address N, from the disc for a read-modify-write operation. At this time, the drive system stores cluster N in an internal memory, performs error correction of the BIS cluster, first, and then error correction of the ECC cluster.

Figure 8B:
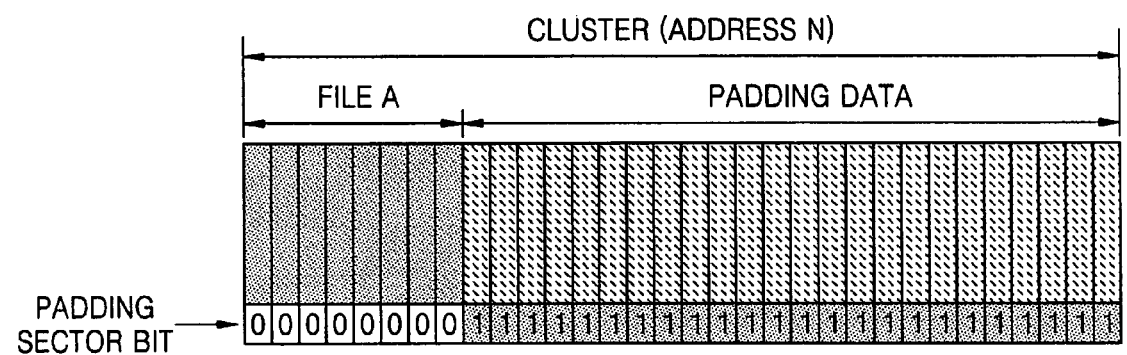

FIG. 8B shows that in the addition process for the file B, error correction of the BIS cluster is successful, and in the error correction process for the ECC cluster, error correction of the 8 sectors for file A of the ECC cluster is successful, but error correction of the remaining 24 sectors is not successful. From the error correction of the BIS cluster, whether padding is performed in each sector in cluster N may be confirmed. As a result, it may be known that the high-order 8 sectors of cluster N are valid data and the low-order 24 sectors are invalid data, that is, padding data.

However, even though error correction of data in a part of the ECC cluster is thus not performed, the addition command may be performed by using padding information of the BIS cluster. That is, if it is known that only invalid data is recorded in a part in which data is desired to be added, even though error correction of data in a part of the ECC cluster is not performed, there is no problem in performing a data addition operation. In other words, since data in the part in which data is added will be overlaid, the data does not need error correction. Also, since invalid data in the remaining part only needs to be padded with padding data, error correction of the remaining part is not needed either.

Figure 8C:
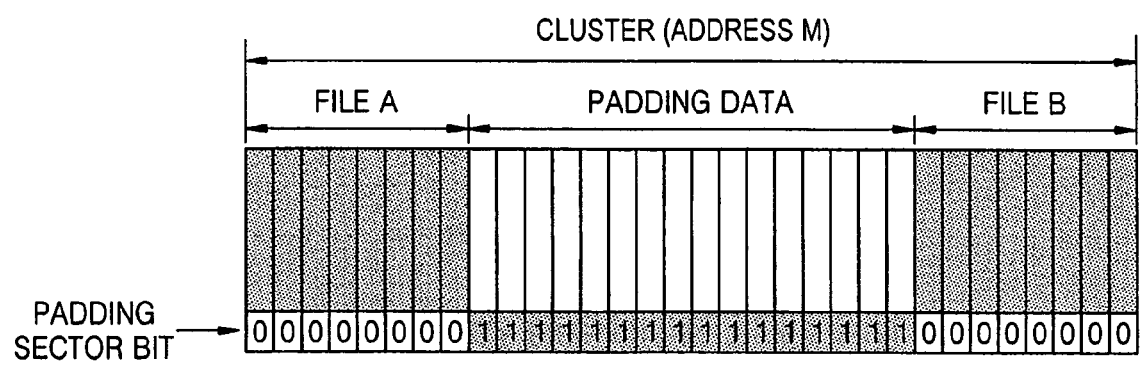

When there is a defect in the cluster shown in FIG. 8B, FIG. 8C shows a cluster in which data is added to a part of the cluster and the cluster is moved to address M replacing address N. In the replacement cluster, valid data file A is included in the high-order 8 sectors, and in the address in which data is desired to be added in the cluster, that is, in the position of the low-order 8 sectors in which padding data is recorded, file B is added and recorded, and in the remaining sectors, padding data is padded. In order to indicate that files A and B are valid data, padding sector bits for sectors of files A and B are expressed as 0's and in order to indicate that padding data is invalid data, padding sector bits for sectors of padding data are expressed as 1's.

Figure 8D:
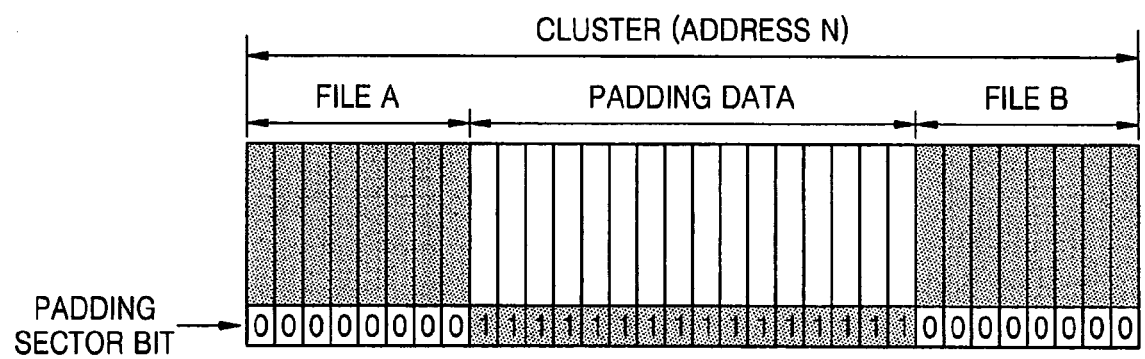

When there is no defect in the cluster shown in FIG. 8B, FIG. 8D shows the cluster in which data is added. When there is no defect in the cluster, by a normal read-modify-write operation, file B is additionally recorded at an address in which data is desired to be added in the cluster, that is, the position of the low-order 8 sectors, and valid data is inserted into the high-order 8 sectors without change, and padding data is padded in the remaining sectors and the cluster is recorded at address N. In order to indicate that files A and B are valid data, padding sector bits for sectors of files A and B are expressed as 0's and in order to indicate that padding data is invalid data, padding sector bits for sectors of padding data are expressed as 1's.

Figure 9:
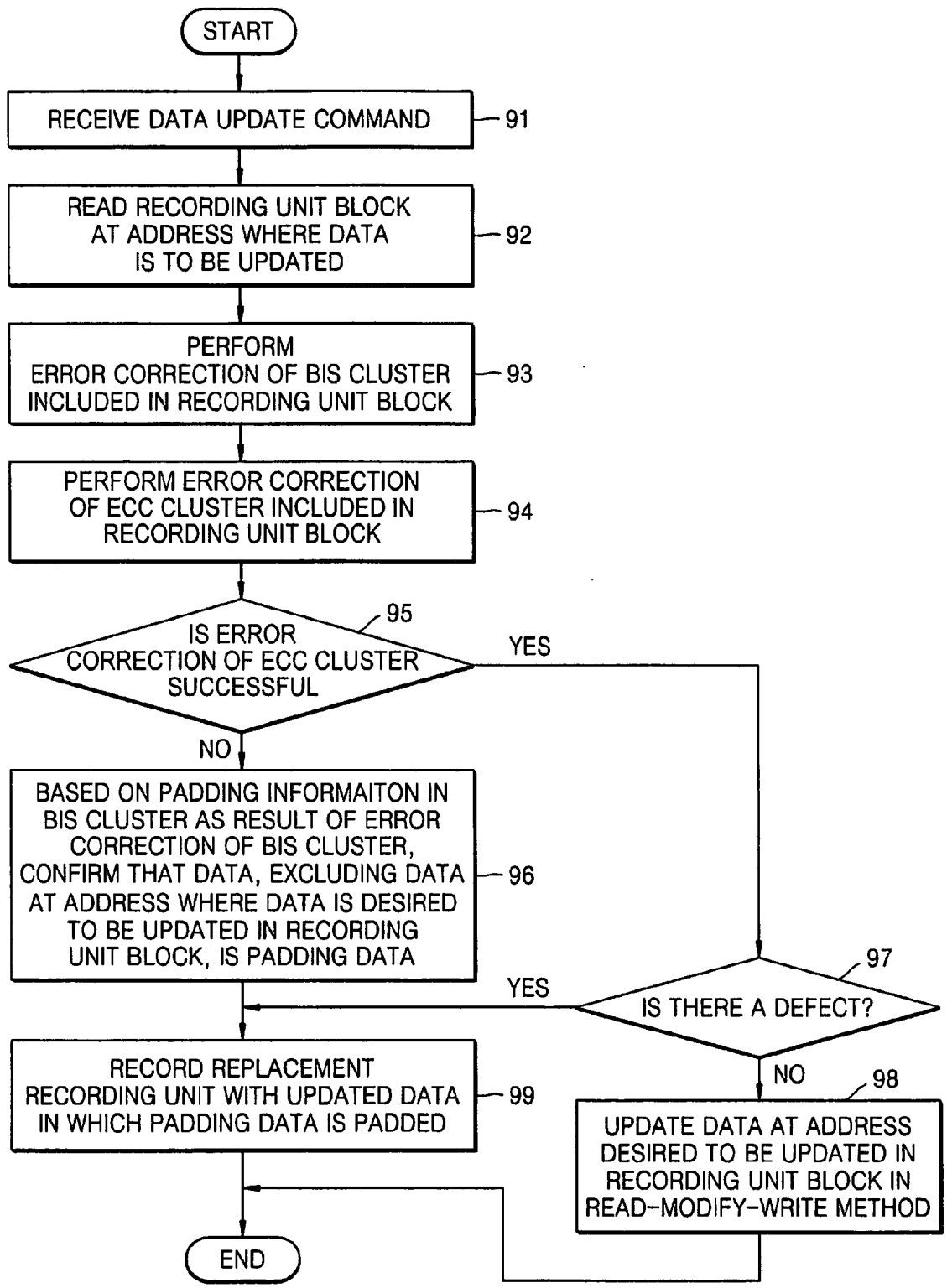
FIG. 9 is a flowchart of a method of updating data of a recording unit block according to an embodiment of the present invention.

FIG. 9 is a flowchart of a method for updating data of a recording unit block according to the present invention.

Referring to FIG. 9, a drive system receives a data update command from a host or an application program in operation 91. The host or application transmits the data update command together with the logical address of data desired to be updated.

Then, the system controller of the drive system finds a physical address corresponding to the logical address of data desired to be updated, reads a recording unit block from the physical address of a disc, and stores the recording unit block in a memory in operation 92. At this time, even when the amount of data to be updated is less than one recording unit block, the drive system reads one recording unit block including the data. For example, assuming that one recording unit block is 32 sectors, even when the amount of data to be updated is 16 sectors, the drive system reads a 32-sector recording unit block including the 16-sector data to be updated, from the disc.

Next, the system controller performs error correction of the BIS cluster of the recording unit block stored in the memory in operation 93.

When the error correction of the BIS cluster is completed, the system controller performs error correction of the ECC cluster of the recording unit block in operation 94.

Then, the system controller determines whether the error correction of the ECC cluster is successful in operation 95, and if the error correction is successful, processes the recording unit block in an ordinary method.

That is, it is determined whether there is a defect in the recording unit block in operation 97. Actually, whether to process the recording unit block as a defect may be determined from the error correction of operation 94. When the determination result indicates that there is no defect, data at a position desired to be updated in the recording unit block stored in the memory is updated and the recording unit block in which the updated data is recorded is recorded on the disc in operation 98. This is the ordinary read-modify-write process.

If the determination result indicates that there is a defect, data is updated in the position desired to be updated in the recording unit block stored in the memory, and the replacement recording unit block in which the updated data is recorded is recorded in a replacement position on the disc in operation 99.

If error correction of the ECC cluster is not successful in operation 95, based on padding information in the BIS cluster as a result of error correction of the BIS cluster, it is confirmed that data, excluding data at an address desired to be updated in the recording unit block, is padding data in operation 96. That is, when according to an embodiment of the present invention, a recording unit block is not filled entirely with valid data, and valid data is filled only in part of the recording unit block and invalid padding data is filled in the remaining part in order to make one recording unit block, padding information that is information on this padding data is further recorded in the recording unit block. By including, for example, information indicating valid sectors and invalid sectors in the padding information, a position in which valid data is recorded in the recording unit block and a position in which invalid data is recorded may be indicated from the padding information. Also, in the embodiment of the present invention, this padding information is included in a BIS cluster such that if error correction of the BIS cluster is performed, the system controller can confirm the positions of valid data and invalid data included in the recording unit block from this padding information.

Accordingly, if it is confirmed that data excluding data in the position desired to be updated in the recording unit block is meaningless padding data, even when error correction of the ECC cluster has failed, the system controller can update data in this recording unit block. This is because data in the position desired to be updated in this recording unit block will be updated anyhow and therefore it does not need error correction, and also, if data except the data in the position desired to be updated is meaningless data, this does not need error correction either.

Accordingly, in this case, the system controller updates data in the position desired to be updated in the recording unit block stored in the memory, and pads padding data in the remaining part to generate a replacement recording unit block, and records this replacement recording unit block in a replacement position on the disc in operation 99.

Figure 10:
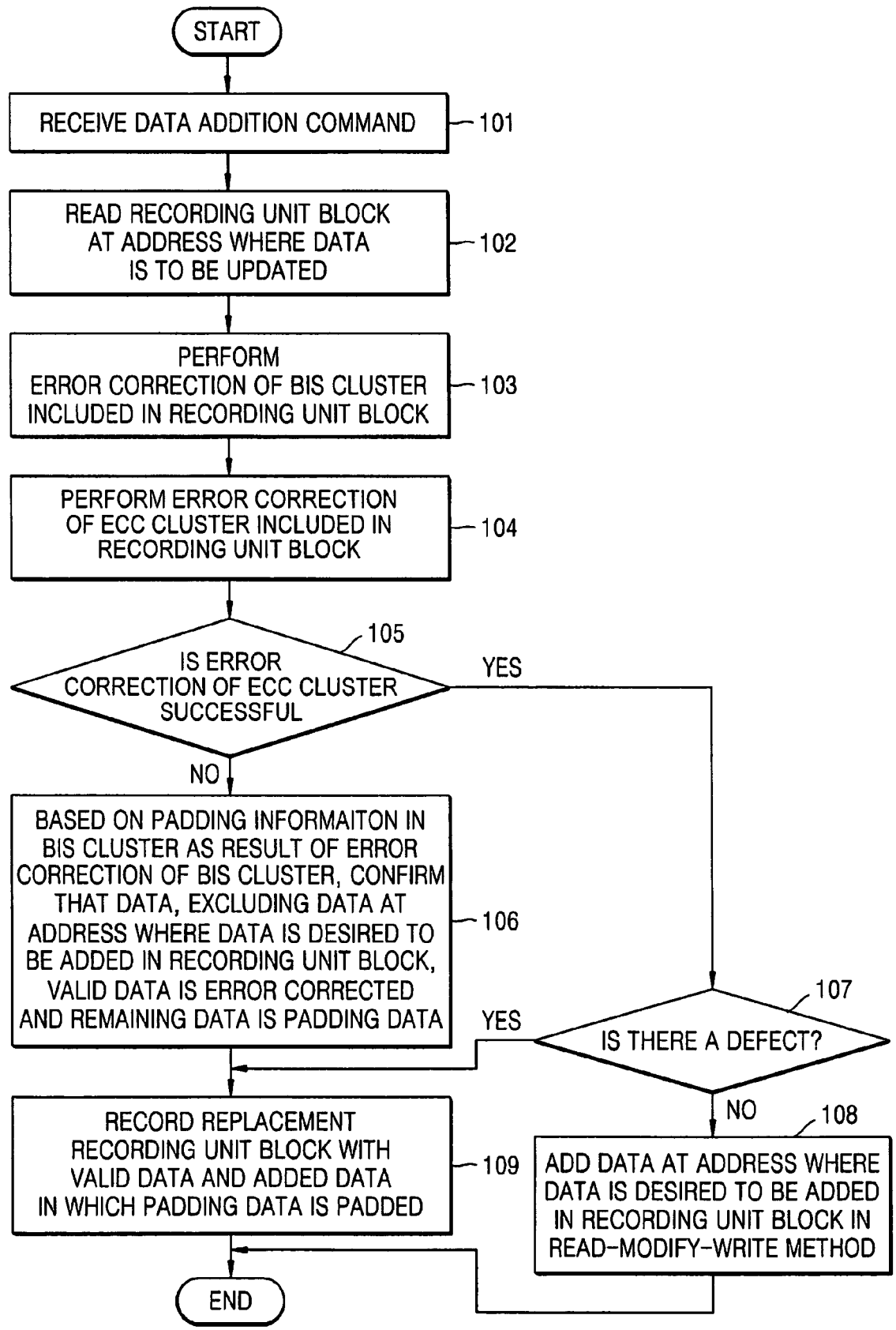
FIG. 10 is a flowchart of the a method of adding data to data of a recording unit block according to an embodiment of the present invention.

FIG. 10 is a flowchart of a method for adding data to data of a recording unit block according to the present invention. The method for adding data to data of a recording unit block is performed in a similar manner to the method for updating data of a recording unit block described above with reference to FIG. 9.

Referring to FIG. 10, a drive system receives a data addition command from a host or an application in operation 101. The host or application transmits the data addition command together with the logical address of data desired to be updated.

Then, the system controller of the drive system finds a physical address corresponding to the logical address of data desired to be added, reads a recording unit block from the physical address of a disc, and stores the recording unit block in a memory in operation 102. At this time, even when the amount of data to be added is less than one recording unit block, the drive system reads one recording unit block including the data. For example, assuming that one recording unit block has 32 sectors, even when the amount of data to be added is 16 sectors, the drive system reads a 32-sector recording unit block including the 16-sector data to be added from the disc.

Next, the system controller performs error correction of the BIS cluster of the recording unit block stored in the memory in operation 103.

If the error correction of the BIS cluster is completed, the system controller performs error correction of the ECC cluster of the recording unit block in operation 104.

Then, the system controller determines whether the error correction of the ECC cluster is successful in operation 105, and if the error correction is successful, processes the recording unit block in an ordinary method.

That is, it is determined whether there is a defect in the recording unit block in operation 107. Actually, whether to process the recording unit block as a defect may be determined from the error correction in operation 104. When the determination result indicates that there is no defect, data at a position in which data is desired to be added in the recording unit block stored in the memory is updated and the recording unit block, in which the added data is recorded, is recorded on the disc in operation 108. This is the ordinary read-modify-write process.

If the determination result indicates that there is a defect, data is added at the position in which data is desired to be added in the recording unit block stored in the memory, and the replacement recording unit block, in which the added data is recorded, is recorded in a replacement position on the disc in operation 109.

If error correction of the ECC cluster is not successful in operation 105, based on padding information in the BIS cluster as a result of error correction of the BIS cluster, it is confirmed that data, excluding data in an address in which data is desired to be added in the recording unit block, is padding data in operation 106. That is, when according to an embodiment of the present invention, a recording unit block is not filled entirely with valid data, and valid data is filled only in part of the recording unit block and invalid padding data is filled in the remaining part in order to make one recording unit block, padding information that is information on this padding data is further recorded in the recording unit block. By including, for example, information indicating valid sectors and invalid sectors in the padding information, a position in which valid data is recorded in the recording unit block and a position in which invalid data is recorded may be indicated from the padding information. Also, in the embodiment of the present invention, this padding information is included in a BIS cluster such that if error correction of the BIS cluster is performed, the system controller can confirm the positions of valid data and invalid data included in the recording unit block from this padding information.

In this case, if it is confirmed that among data excluding data in the position desired to be added in the recording unit block is meaningless padding data, error correction of valid data is performed and the remaining data is meaningless padding data, even when error correction of the ECC cluster has partially failed, the system controller can add data in this recording unit block. This is because data at the position in which data is desired to be added in this recording unit block will be updated anyhow and therefore it does not need error correction. Also, among data except data at the position in which data is desired to be added, valid data has no problem because error correction of the valid data is performed, and when the part for which error correction is not performed is formed with meaningless data, this meaningless data does not need error correction.

Accordingly, the system controller adds data at the position in which data is desired to be added in the recording unit block stored in the memory, and maintains valid data and padding data without change to generate a replacement recording unit block, and records this replacement recording unit block in a replacement position on the disc in operation 109.

Figure 11:
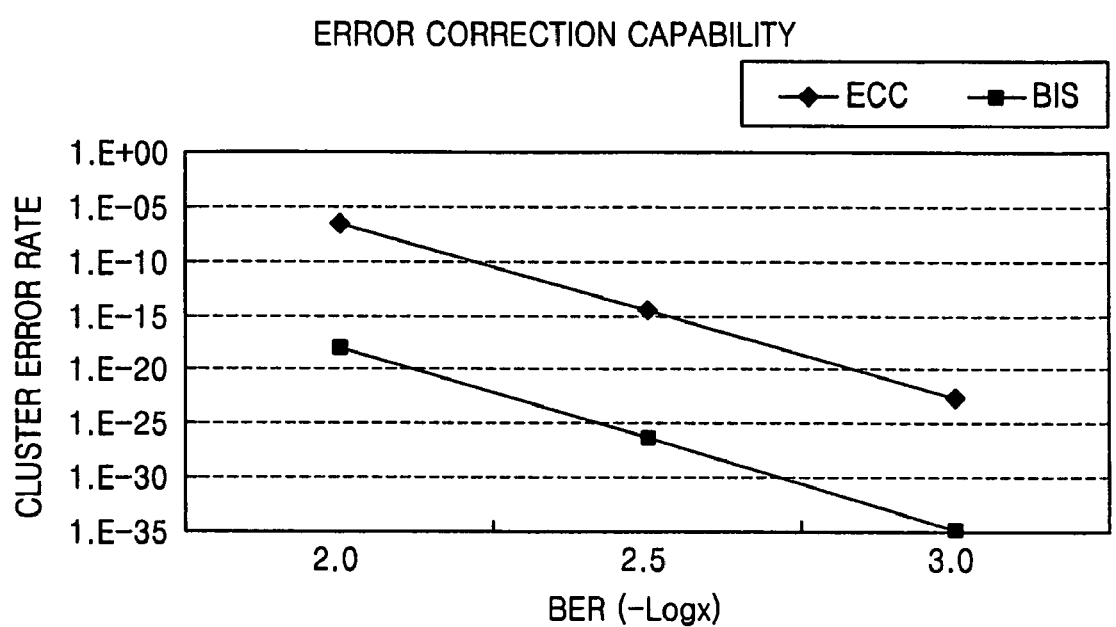
FIG. 11 is a graph for comparing error correction capabilities of an ECC cluster and a burst indicator subcode (BIS) cluster.

FIG. 11 is a graph for comparing error correction capabilities of an ECC cluster and a BIS cluster.

Referring to FIG. 11, a comparison of error correction capabilities of a BIS cluster and an ECC cluster by a random error is shown. It is shown that in case of the random error, the error correction capability of the BIS cluster is much better than that of the ECC cluster. The difference of error correction for random error occurs because LDC codewords are (248, 216, 33) codewords with 216 bytes of information and 32 bytes of parity and BIS codewords are (62, 30, 33) codewords with 30 bytes of information and 32 bytes of parity.

Thus, though the numbers of parity bytes are the same, the length of information of the BIS cluster is much shorter such that the difference of error correction capabilities is shown as in FIG. 11.

The difference of error correction capabilities of the BIS cluster and the ECC cluster in relation to burst error will now be explained. Since in each codeword of the ECC cluster, the number of parity bytes is 32, it is possible to correct a maximum of 32 bytes in each codeword by erase correction using the BIS bytes and the interleaving method. Accordingly, in the ECC cluster, it is possible to correct a maximum of 64 recording frames in a recording unit block. Meanwhile, in the BIS cluster, though the number of parity bytes in each codeword is the same as in the LDC codeword, erase correction is not performed such that in each BIS codeword, a maximum of 16 error bytes should be corrected, but since the BIS cluster is formed with 24 BIS codewords and the codewords are evenly interleaved in the entire BIS cluster, a maximum of 128 recording frames in a recording unit block may be corrected. For example, if it is possible to correct errors occurring in the ECC cluster, including a very long error such as a scratch of maximum 1 cm, it is possible to correct errors occurring in the BIS cluster, including a very long error such as a scratch of maximum 2 cm, double the length of the maximum scratch in the ECC cluster.

Accordingly, since the situation as in FIG. 7B and 8B described above, that is, the situation in which the BIS cluster is error correctible but error correction of the ECC cluster is impossible, frequently occurs, in this situation, padding information for each sector in the BIS cluster is inserted as disclosed in the present invention. Then, in the read process of the read-modify-write operation, even though the ECC cluster is defective, adding or updating data is performed by using the padding information such that unnecessary retrial processes of the drive system may be reduced and the performance of the drive system may be improved.

The present invention may also be embodied as computer readable codes on a computer readable recording medium. The computer readable recording medium is any data storage device that can store data which may be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention may be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the present invention as described above, by performing a data addition or update operation by confirming invalid data included in a recording unit block in advance, unnecessary retrial processes of the drive system may be reduced and the performance of the drive system may be improved. Also, as a result of not reporting a data addition or update operation that may be actually performed as an error, the error correction capability may be improved.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A data recording and/or reproducing apparatus comprising:
    a writing/reading unit to record a recording unit block of a predetermined size in which valid data is included in part of the recording unit block and invalid data is padded in the remaining part of the recording unit block, on an information recording medium, or to read the recording unit block from the information recording medium; and
    a control unit connected to the writing/reading unit, and arranged to control the writing/reading unit to update valid data in the recording unit block based on padding information,
    wherein the recording unit block comprises a first cluster including a plurality of data units and a second cluster comprising address information regarding the plurality of data units, and
    wherein the second cluster further comprises the padding information indicating whether each of the plurality of data units comprises the invalid data.

2. The data recording and/or reproducing apparatus of claim 1, wherein the control unit controls the writing/reading unit to update valid data included in the recording unit block regardless of error correction of data of the recording unit block such that if the padding information confirms that data, excluding data desired to be updated in the recording unit block, is invalid data.

3. The data recording and/or reproducing apparatus of claim 2, wherein the control unit is further configured to:
    control the writing/reading unit to perform error correction of the recording unit block including the padding information;
    confirm that data excluding the data desired to be updated in the recording unit block is invalid data from error corrected padding information;
    generate a replacement recording unit block by padding the invalid data with the updated data even when error correction of the recording unit block has failed; and
    control the writing/reading unit to record the generated replacement recording unit block in a replacement position of the information recording medium.

4. The data recording and/or reproducing apparatus of claim 1, wherein the control unit controls the writing/reading unit to update data desired to be updated included in the recording unit block regardless of error correction of the invalid data if the padding information confirms that among data, excluding data desired to be updated in the recording unit block, valid data and invalid data are included.

5. The data recording and/or reproducing apparatus of claim 4, wherein the control unit is further configured to:
    control the writing/reading unit to perform error correction of the recording unit block including the padding information;
    confirm that valid data and invalid data are included in data excluding the data desired to be updated in the recording unit block from error corrected padding information;
    generate a replacement recording unit block by updating data desired to be updated in the recording unit block even when error correction of the invalid data has failed; and
    control the writing/reading unit to record the replacement recording unit block in a replacement position of the information recording medium.

6. A data recording and/or reproducing apparatus comprising:
    a writing/reading unit to record on an information recording medium a recording unit block of a predetermined size in which valid data is included in part of the recording unit block and invalid data is padded in the remaining part of the recording unit, or to read the recording unit block from the information recording medium; and
    a control unit connected to the writing/reading unit, and arranged to control the writing/reading unit to add new data in the recording unit block based on padding information,
    wherein the recording unit block comprises a first cluster including a plurality of data units and a second cluster comprising address information regarding the plurality of data units, and
    wherein the second cluster further comprises the padding information indicating whether each of the plurality of data units comprises the invalid data.

7. The data recording and/or reproducing apparatus of claim 6, wherein the control unit controls the writing/reading unit to add the new data to the recording unit block regardless of error correction of data of the recording unit block if the padding information confirms that data, excluding data desired to be added in the recording unit block, is invalid data.

8. The data recording and/or reproducing apparatus of claim 7, wherein the control unit is further configured to:
    control the writing/reading unit to perform error correction of the recording unit block including the padding information;
    confirm that invalid data is recorded in a position excluding the position in which data is desired to be added in the recording unit block from error corrected padding information;
    generate a replacement recording unit block by padding the invalid data with the new data even when error correction of the recording unit block has failed; and
    control the writing/reading unit to record the replacement recording unit block in a replacement position of the information recording medium.

9. The data recording and/or reproducing apparatus of claim 6, wherein the control unit controls the writing/reading unit to add new data to add new data to the recording unit block regardless of error correction of the invalid data if the padding information confirms that valid data and invalid data are recorded in a position excluding the position in which data is desired to be added in the recording unit block.

10. The data recording and/or reproducing apparatus of claim 9, wherein the control unit is further configured to:
control the writing/reading unit to perform error correction of the recording unit block including the padding information;
confirm that valid data and invalid data are recorded in a position excluding the position in which data is desired to be added in the recording unit block from error corrected padding information;
generate a replacement recording unit block by adding the new data to the recording unit block even when error correction of the invalid data has failed; and
control the writing/recording unit to record the replacement recording unit block in a replacement position of the information recording medium.

* * * * *